United States Patent [19]

Mehrotra et al.

[11] Patent Number: 4,826,791

[45] Date of Patent: May 2, 1989

[54] SILICON CARBIDE-ALPHA PRIME SIALON BETA PRIME SIALON

[75] Inventors: Pankaj K. Mehrotra; Klaus-Markus Peters, both of Greensburg; Joyce L. Swiokla, Ligonier, all of Pa.

[73] Assignee: Kennametal Inc., Latrobe, Pa.

[21] Appl. No.: 56,096

[22] Filed: May 29, 1987

[51] Int. Cl.$^4$ .................. C04B 35/56; C04B 35/58
[52] U.S. Cl. .......................... 501/89; 501/92; 501/98; 501/88
[58] Field of Search ............ 501/87, 88, 89, 92, 501/98

[56] References Cited

U.S. PATENT DOCUMENTS

| | | | |
|---|---|---|---|
| 3,890,250 | 6/1975 | Richerson | 252/516 |
| 3,991,166 | 11/1976 | Jack et al. | 423/327 |
| 4,127,416 | 11/1978 | Lumby et al. | 106/73.2 |
| 4,184,882 | 1/1980 | Lange | 106/44 |
| 4,547,470 | 10/1985 | Tanase et al. | 501/87 |
| 4,563,433 | 1/1986 | Yeckley et al. | 501/97 |
| 4,594,106 | 6/1986 | Tanaka et al. | 106/1.12 |

FOREIGN PATENT DOCUMENTS

| | | | |
|---|---|---|---|
| 60-246268 | 12/1985 | Japan | 501/98 |
| 60-260471 | 12/1985 | Japan | 501/92 |
| 61-291463 | 12/1986 | Japan . | |
| 2157282 | 10/1985 | United Kingdom | 501/98 |

*Primary Examiner*—William R. Dixon, Jr.
*Assistant Examiner*—Ann Marie Bosco
*Attorney, Agent, or Firm*—John J. Prizzi

[57] ABSTRACT

A ceramic composite is provided possessing a combination of high fracture toughness, high hardness and high wear resistance. The composite contains SiC particles dispersed in a ceramic matrix of mainly sialon. The sialon is composed of about 10 to 67 weight percent alpha prime sialon, with the remainder, being beta prime sialon.

20 Claims, 3 Drawing Sheets

SILICON CARBIDE-ALPHA PRIME SIALON BETA PRIME SIALON

BACKGROUND OF THE INVENTION

The present invention is related to ceramic compositions containing SiC and alpha prime/beta prime sialon, and possessing a combination of high hardness and high toughness.

Prior art commercial SiC components such as seal rings, nozzles and bearings, while having high room temperature hardness, high abrasion resistance and high thermal conductivity, have poor fracture toughness, making them unsuitable for, or reducing their lifetime in, many applications where impact may occur.

The range of useful applications of SiC components is further limited by the fabrication methods which are used to fabricate dense SiC articles. Fabrication of commercial SiC articles is performed by (1) hot pressing, which is a method that is usually only economical for relatively simple final component shapes; (2) sintering which, while allowing more complex shapes to be made, is also very costly due to the high temperatures (2000°–2300° C.) required to densify SiC; and (3) reaction bonding which, while capable of producing complex shapes, has inferior properties due to the presence of free silicon.

Alpha prime-beta prime sialons are described in U.S. Pat. Nos. 4,563,433 and 4,547,470, and are exemplified by the commercial prior art composition, KYON 2000, which contains about 5 to 40 w/o (weight percent) alpha prime sialon, with the remainder being essentially beta prime sialon, except for minor phases which are mainly a result of sintering aid residues. (KYON is a trademark of Kennametal Inc. for its ceramic compositions and articles.) Alpha prime-beta prime sialons, while having higher fracture toughness, have lower hardness, abrasion resistance, thermal conductivity and a lower Young's modulus compared with commercial SiC.

Alpha prime-beta prime sialons, while having higher hardness than beta prime sialons, have lower fracture toughness than beta prime sialons with fracture toughness decreasing as alpha prime content increases. Beta prime sialons are described in U.S. Pat. Nos. 3,991,166 and 4,127,416, and are exemplified by the prior art commercial composition, KYON-3000, which is all beta prime sialon except for minor phases which are a result of sintering aid residues.

Beta prime sialon has the formula $Si_{6-z}Al_zO_zN_{8-z}$, where $0 < z \leq 5$. Alpha prime sialon has the formula $(Si,Al)_{12}M_x(O,N)_{16}$, where M is a sintering aid metal.

A ceramic composite composition of very fine (1 micron or less average size) SiC particles in a beta prime sialon ceramic matrix is referred to in Richerson U.S. Pat. No. 3,890,250.

There therefore continues to be a need for an improved ceramic composition having both a hardness approaching pure SiC while also having high toughness.

SUMMARY OF THE INVENTION

Applicants have now surprisingly discovered that SiC particles may be dispersed in an alpha prime/beta prime sialon matrix containing about 10 to about 67 w/o alpha prime sialon to provide improved hardness without having a significantly adverse affect on the fracture toughness of the material.

Applicants have also surprisingly found that the fracture toughness of the composites in accordance with the present invention increases as their alpha prime sialon content increases.

The composite according to the present invention also has other properties, such as thermal conductivity, Young's modulus, abrasion resistance, thermal expansion coefficient which are increased compared with alpha prime-beta prime sialon. In addition, it has been found that the present composite (containing less than about 30 v/o SiC particles) can be sintered and hot isostatically pressed at temperatures significantly below that required to densify commercial sintered or hot pressed SiC components, thus easing and reducing the cost of fabrication compared to SiC component fabrication.

In accordance with the present invention, a ceramic composite is provided containing 5 to 50 v/o SiC particles dispersed in a ceramic matrix. The SiC particles have a median size between about 1.5 to 15 microns, and preferably 2 to 9 microns. The ceramic matrix is essentially sialon. The sialon contains at least 10 w/o, and preferably, where high hardness and high toughness are desired, at least 50 w/o, alpha prime sialon, with the remainder being essentially beta prime sialon. The composite has a density of at least 3.1 g/cc, and preferably at least 3.15 g/cc.

Preferably, however, for ease of fabrication (i.e., sinterability) SiC content should be limited to about 5 to 30 v/o.

More preferably, for higher hardness and higher toughness, the alpha prime solution phase forms at least 60 w/o of the sialon in the ceramic matrix.

In applications where thermal conductivity may be more important than high hardness and toughness, alpha prime contents of 10 to 50 w/o may be preferred.

BRIEF DESCRIPTION OF THE DRAWINGS

These and other aspects of the present invention will become more apparent upon review of the following detailed description and the drawings in which.

DETAILED DESCRIPTION OF THE INVENTION

Figure 1:
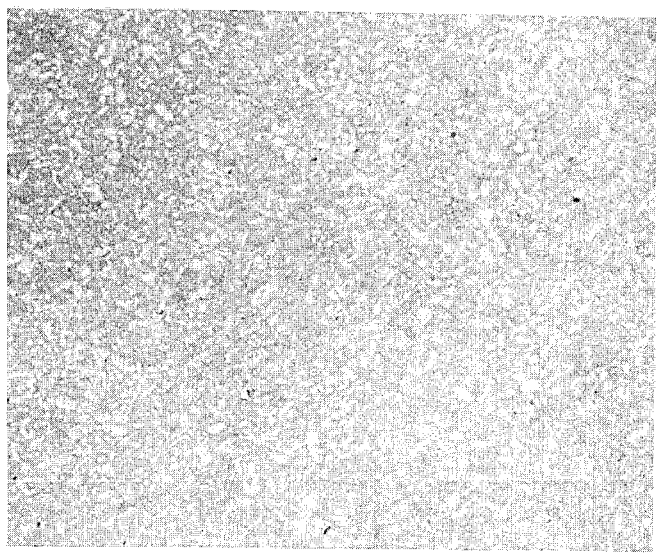
FIG. 1 is a photomicrograph (500×) of an as polished section through a ceramic composite in accordance with the present invention.

Applicants have now surprisingly found that SiC particles may be dispersed in a ceramic matrix containing alpha prime sialon to provide a ceramic composite that has high fracture toughness, high hardness and other enhanced properties. In order to successfully achieve these results, it has been found necessary to control the SiC particle size, the level of SiC in the ceramic composite, the amount of alpha prime sialon in the matrix, as well as the density of the final material.

The level of SiC in the composite should be at least 5 v/o in order to obtain a minimal improvement in hardness. At about 15 to 50 v/o SiC, the hardness of the ceramic composite can be significantly improved (over that of commercial alpha prime-beta prime sialon-RA (Rockwell A) about 93.6) and may even approach that of commercial SiC (about 95 to 96 RA). However, SiC content should preferably not be increased beyond about 30 v/o. We believe that further increases in SiC content, while improving thermal and electrical conductivity, making it more readily electrodischarge machinable, will be accompanied by a reduction in sinterability (decreased densification) and toughness of the material.

In order to achieve the maximum hardness for a given composition within the ranges of the present invention, we have found it to be critical to produce a density of at least 3.10 g/cc and preferably at least 3.15 g/cc. We believe that these densities can be achieved by hot pressing, pressureless sintering, hot isostatic pressing, (HIP), pressure sintering, sinter-HIP, or encapsulated HIP.

In alpha prime-beta prime sialons, one or more minor phases, the result of sintering aid residues, are normally present in amounts of 0.1 to 10 w/o. These minor phases are typically intergranular and include a glassy or crystalline phase. Where yttria is used as the sintering aid, these minor phases may include YAG, N-YAM, Y-N-alpha-Wollastonite, B-phase, N-apatite and N-melilite. In the present invention, we have found it important to control the amount of minor phase in the ceramic matrix between about 0.1 and 15.0 w/o. We have found that, where there is insufficient minor phase, the ceramic composite is more difficult to densify during sintering, but we have also found that if too much minor phase is present, there will be a reduction in the useful properties of the ceramic composite. While not wishing to be bound by theory, we have theorized that the amount of minor phase present should be controlled within the foregoing range to form a very thin intergranular phase at least substantially encircling the SiC particles, and which we believe separates the SiC from the sialon. Therefore, for optimum results, we theorize that the amount of minor phase(s) desired is dependent upon the volume percent of SiC as well as the size of the SiC particles.

It is, therefore, preferable to control the median size of the SiC particles to within the range of 1.5 to 15 microns. We believe that in order to achieve a product that will not require an excessive amount of minor phase which can reduce hardness and adversely affect other useful properties, that the average SiC particle size should be at least 1.5 microns. The upper limit of about 15 microns is believed to be necessary to assure an optimum hardening affect for a given volume of SiC particles. More preferably, the median size of the SiC particles should be between 2 and 9 microns.

In order to assure high hardness is obtained, the level of alpha prime sialon in the sialon of the ceramic matrix is 10 to 67 w/o of the sialon present, with 33 to 90 w/o beta prime forming the remainder, of the sialon. Preferably, for obtaining optimum hardness and toughness, the alpha prime content of the sialon should be at least 50 w/o, and more preferably, at least 60 w/o.

The invention will be further clarified by consideration of the following examples which are intended to be purely exemplary of the invention.

Table I provides a listing of the compositions evaluated in Examples 1–5 which follow. In Mixes 1–4 and 12–23, the ceramic matrix powder mix utilized was: 83.8 w/o $Si_3N_4$-5.7 w/o AlN-3.9 w/o $Al_2O_3$-6.6 w/o $Y_2O_3$. In Examples 5–11, the ceramic matrix powder mix utilized was: 85.5 w/o $Si_3N_4$-5.8 w/o AlN-4.0 w/o $Al_2O_3$-4.7 w/o $Y_2O_3$. The SiC starting powders were obtained from Lonza Ltd., Inorganic Chemical Division, CH-4002 Basel, Switzerland. The 5.5 micron SiC powder, which we found to provide the best results, was Lonza grade LS-5. The SiC particle sizes shown in Table I are as received sizes. Measurements made after blending have shown that there is no significant reduction in SiC particle size. Therefore, the median SiC powder sizes shown in Table I are also the median SiC particle size in the final densified composites according to the present invention.

TABLE I

| Mix No. | v/o Ceramic Matrix | v/o SiC | Median SiC Particle Size (microns) |
|---|---|---|---|
| 1 | 100 | 0 | — |
| 2 | 85 | 15 | 5.5 |
| 3 | 80 | 20 | 5.5 |
| 4 | 75 | 25 | 5.5 |
| 5 | 70 | 30 | 0.8 |
| 6 | 70 | 30 | 1.6 |
| 7 | 70 | 30 | 5.5 |
| 8 | 70 | 30 | 9.6 |
| 9 | 70 | 30 | 12.5 |
| 10 | 70 | 30 | 23.0 |
| 11 | 70 | 30 | 45.0 |
| 12–18 | 75 | 25 | 5.5 |
| 19 | 95 | 5 | 5.5 |
| 20 | 90 | 10 | 5.5 |
| 21 | 85 | 15 | 5.5 |
| 22 | 80 | 20 | 5.5 |
| 23 | 75 | 25 | 5.5 |

EXAMPLE 1

The ceramic matrix powder mixture was premilled to obtain a median particle size of about 0.7 micron. The final powder blend for each mix (1 to 4) was then made by adding the necessary amount of SiC powder to the required weight of premilled ceramic matrix powder to produce 400 gm batches. These powders were then blended for 24 hours in a mill jar using 2 kilograms of sialon cycloids and 1 liter of isopropanol solvent. After blending, the powder was dried and then screened through a 40 mesh sieve. Green samples formed by cold isostatic pressing were subsequently sintered using conventional sialon sintering techniques at 1750° to 1850° C. for 1 hour under 1 atmosphere nitrogen.

For instance, in Mix No. 4 green compacts were placed in a SiC lined graphite pot and sintered at a temperature of 1850° C. Following sintering, densification of all samples was completed by hot isostatic pressing for 1 hour at 1800° C. under a 20,000 psi nitrogen atmosphere.

TABLE II

| Mix No. | v/o SiC | w/o Alpha Prime in Sialon[1] | Density g/cc |
|---|---|---|---|
| 1 | 0 | 33 | 3.27 |
| 2 | 15 | 47 | 3.22 |
| 3 | 20 | 60 | 3.18 |
| 4 | 25 | 67 | 3.17 |

[1]Alpha prime content was determined by x-ray diffraction. Beta prime is the remainder of the sialon. The presence of the minor phases in the ceramic matrix (i.e., due to sintering aid residues) is ignored by this measurement technique.

The foregoing example shows that sintering and HIPping produce acceptable densification in the composite of the present invention. It should also be noted that density dropped as SiC content increased indicating that densification via sintering and HIPping becomes more difficult with increasing SiC content. A typical as polished microstructure of a composite made in accordance with the present invention is shown in FIG. 1. In this figure, 25 v/o of substantially equiaxed SiC particles (light grey phase) having a median size of 5.5 microns, are dispersed in a ceramic matrix (dark material) containing alpha prime sialon, beta prime sialon and minor phases due to sintering aid residues.

EXAMPLE 2

Mixes 5-11 were processed in a manner similar to that detailed for Mixes 1-4, except that densification was achieved by hot pressing at a pressure of 5000 psi applied for about one-fourth hour at 1850° C.

Figure 2:
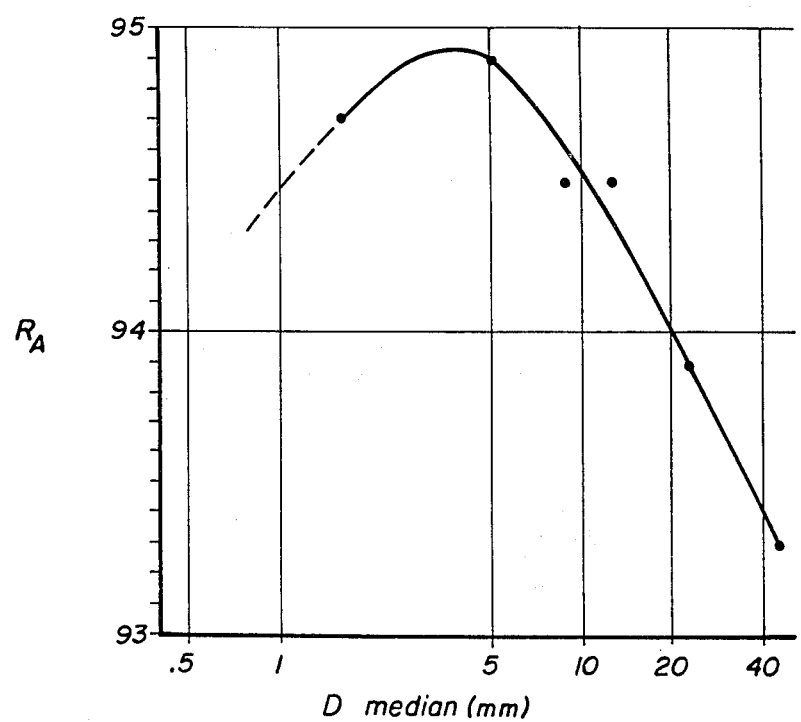
FIG. 2 shows the Rockwell A hardness of hot pressed ceramic composites as a function of SiC particle size.

The fracture toughness, hardness and density of the hot pressed samples were determined and are shown in Table III. These results illustrate the effect of SiC particle size on hardness (see FIG. 2). It can clearly be seen that for a given SiC content (e.g. 30 v/o) and a given alpha prime to beta prime ratio (e.g. between 15/85 to 22/78) hardness is increased in the SiC particle size range of about 1.5 to 15 microns (Mixes 6-9) compared to SiC particle sizes below (Mix 5) or above (Mixes 10-11) this size range. The best hardness results were obtained in Mixes 6 and 7, which utilized SiC particle sizes of about 1.6 and about 5.5 microns, respectively.

TABLE III

Hot Pressed Results

| Mix No. | Size v/o SiC | Median SiC Particle Size (microns) | w/o Alpha prime in Sialon | Density (g/cc) | Hardness[1] RA (X) | (S) | Fracture Toughness $K_{IC}$ (E & C)[2] (MPa m$^{\frac{1}{2}}$) (X) | (S) |
|---|---|---|---|---|---|---|---|---|
| 5 | 30 | 0.8 | 0 | 3.23 | 94.3 | 0.1 | 7.05 | 0.27 |
| 6* | 30 | 1.6 | 15 | 3.25 | 94.7 | 0.2 | 6.47 | 0.10 |
| 7* | 30 | 5.5 | 17 | 3.24 | 94.9 | 0.2 | 6.08 | 0.34 |
| 8* | 30 | 9.6 | 17 | 3.25 | 94.5 | 0.1 | 6.81 | 0.34 |
| 9* | 30 | 12.5 | 22 | 3.24 | 94.5 | 0.1 | 7.30 | 0.20 |
| 10 | 30 | 23.0 | 19 | 3.24 | 93.9 | 0.2 | 5.74 | 0.32 |
| 11 | 30 | 45.0 | 20 | 3.24 | 93.3 | 0.3 | 6.08 | 0.10 |

*In accordance with the present invention.
[1]average Rockwell A hardness (x) and standard deviation (s) based on 5 tests
[2]average $K_{IC}$ and standard deviation based on at least 3 and no more than 5 tests $K_{IC}$ was determined in accordance with Evans and Charles, "Fracture Toughness Determinations by Indentation," J. Am. Ceramic Society, Vol. 59, No. 7-8, Page 731.

EXAMPLE 3

Mixes 12-18 were processed in the same way as described in Example 1.

TABLE IV

EFFECT OF ALPHA PRIME CONTENT

| Mix No. | Alpha'/Beta' (w/o/w/o) | Hardness RA | Fracture Toughness $K_{IC}$ (E&C) (MPa m$^{\frac{1}{2}}$) |
|---|---|---|---|
| 12 | 26/74 | 94.1 | 5.58 |
| 13 | 36/64 | 94.5 | 6.43 |
| 14 | 47/53 | 94.4 | 6.56 |
| 15 | 51/49 | 94.4 | 6.90 |
| 16 | 52/48 | 94.9 | 6.71 |
| 17 | 65/35 | 94.8 | 7.17 |
| 18 (same as 4) | 67/33 | 95.1 | 6.49 |

Figure 3:
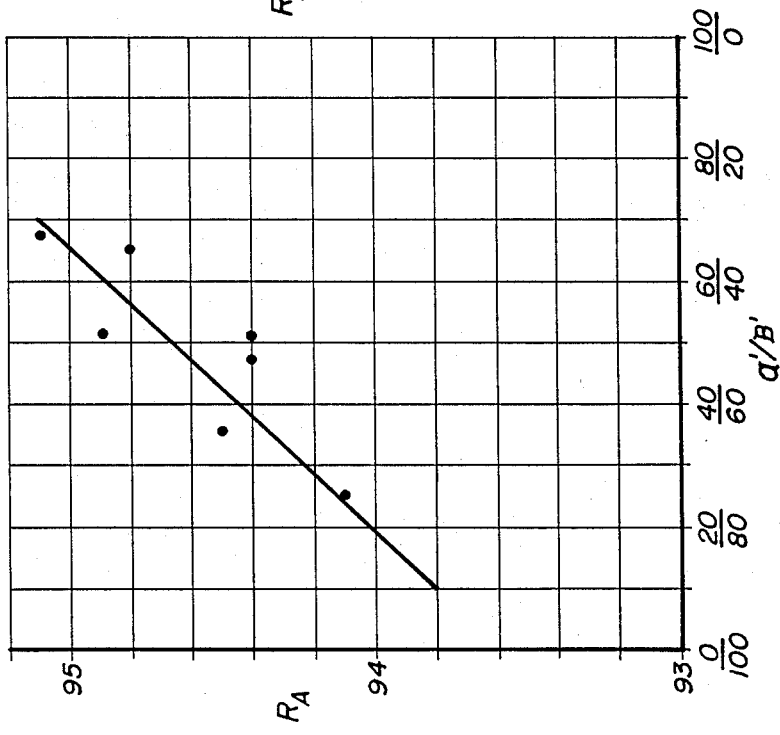
FIG. 3 shows Rockwell A hardness of sintered and HIPped composites as a function of the ratio of alpha prime/beta prime sialon.

These mixes (see Table IV) were made to show the effect of the alpha prime content on the hardness of sintered and HIPped composites according to the present invention. The effect on hardness is illustrated in FIG. 3 where Rockwell A hardness is plotted as a function of the ratio of w/o alpha prime to w/o beta prime sialon. The compositions utilized to obtain this plot contained 25 v/o SiC having a median particle size of about 5.5 microns (LS-5 starting powder). The yttria addition to the ceramic matrix starting materials was held constant at 6.6 w/o. It can clearly be seen from FIG. 3 that the hardness of the present composites increases with alpha prime content in a strong linear fashion.

EXAMPLE 4

Mixes 19-23 were processed in the same manner as described in Example 1.

Figure 4:
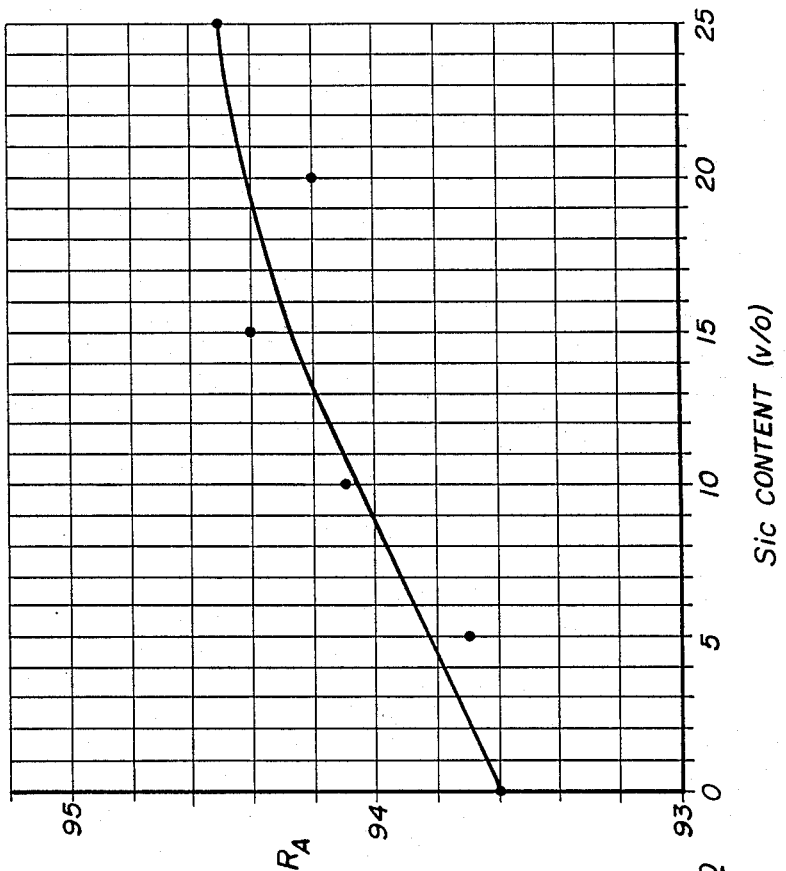
FIG. 4 shows Rockwell A hardness as a function of the SiC content of the composite.

The effect of the SiC content on the hardness of sintered and HIPped composites according to the present invention is shown in Table V and FIG. 4. In this case, compositions were prepared with SiC contents varying from 5 to 25 v/o while holding the particle size constant at about 5.5 microns (LS-5), the yttria additions to the matrix constant at 6.6 w/o and the alpha prime content substantially constant at about 28 to 36 w/o of the sialon. As can be seen from FIG. 4, Rockwell A hardness increases steadily with increasing SiC content, but the rate of increase may slow down somewhat at SiC contents above about 15 v/o.

TABLE V

EFFECT OF SIC CONTENT ON COMPOSITE HARDNESS

| Mix No. | SiC % | RA | Density | Alpha'/Beta' (w/o/w/o) | $K_{IC}$-E&C (MPa m$^{\frac{1}{2}}$) |
|---|---|---|---|---|---|
| 1 | 0 | 93.6 | 3.27 | 28/72 | 6.57 |
| 19 | 5 | 93.7 ± .1 | 3.27 | 28/72 | 5.49 |

TABLE V-continued

EFFECT OF SIC CONTENT ON COMPOSITE HARDNESS

| Mix No. | SiC % | RA | Density | Alpha'/Beta' (w/o/w/o) | $K_{IC}$-E&C (MPa m$^{\frac{1}{2}}$) |
|---|---|---|---|---|---|
| 20 | 10 | 94.1 ± .2 | 3.27 | 33/66 | 6.48 |
| 21 | 15 | 94.4 ± .2 | 3.27 | 31/69 | 5.23 |
| 22 | 20 | 94.3 ± .2 | 3.26 | 29/71 | 6.02 |
| 23 | 25 | 94.5 ± .2 | 3.26 | 36/64 | 5.88 |

EXAMPLE 5

Figure 5:
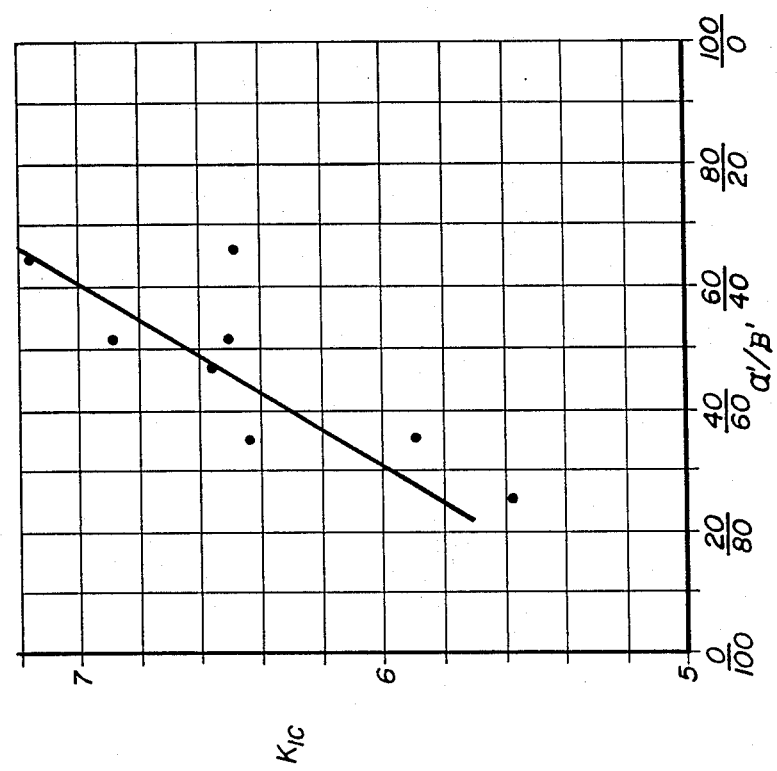
FIG. 5 shows fracture toughness of sintered and HIPped composites as a function of the ratio of alpha prime/beta prime sialon.

The fracture toughness data from Example 3 and from Mix 23 of Example 4 were plotted in FIG. 5 to illustrate that at a given level of SiC content (25 v/o), fracture toughness increases with increasing alpha prime content (or increasing alpha prime/beta prime ratio).

Figure 6:
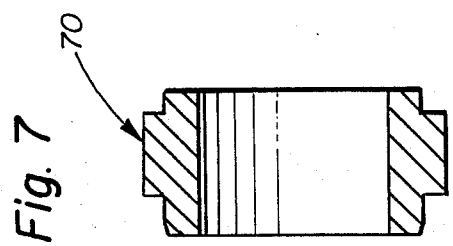
FIG. 6 shows a longitudinal cross section through a cylindrical nozzle in accordance with the present invention.
Figure 7:
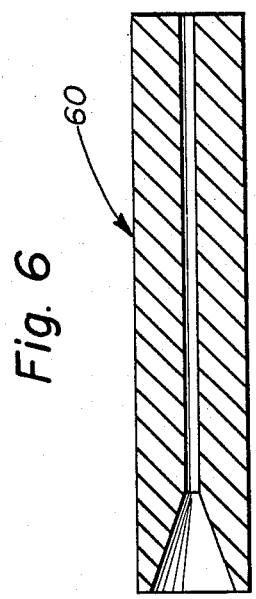
FIG. 7 shows a longitudinal cross section through an annular seal ring in accordance with the present invention.

It is now contemplated that the material in accordance with the present invention may be utilized in those applications requiring both high wear resistance and high fracture resistance. It is specifically contemplated that the present invention can be utilized to make bearings and components for fluid handling systems such as nozzles and seal rings. Examples of conventional nozzle 60 and seal ring 70 geometries which may be made from the present composite are illustrated in FIGS. 6 and 7, respectively. In conjunction with the seal ring shown, it may be preferable to keep the alpha prime content within 10 to 50 w/o for optimum thermal conductivity.

All patents and other publications referred to herein are hereby incorporated by reference in their entireties.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

What is claimed is:

1. A ceramic composite consisting essentially of:
5 to 50 v/o substantially equiaxed SiC particles dispersed in a ceramic matrix;
said ceramic matrix consists essentially of sialon;
said sialon composed of about 10 to about 67 w/o alpha prime sialon, with beta prime sialon forming the remainder of said sialon;
said SiC particles have a median size of about 1.5 to 15 microns;
and said ceramic composite having a density of at least 3.1 g/cc.

2. The ceramic composite according to claim 1 wherein said SiC particles are present at a level of 15 to 30 v/o.

3. The ceramic composite according to claim 1 wherein said sialon is composed of at least 50 w/o alpha prime sialon.

4. The ceramic composite according to claim 2 wherein said sialon is composed of at least 50 w/o alpha prime sialon.

5. The ceramic composite according to claim 1 wherein said sialon is composed of at least 60 w/o alpha prime sialon.

6. The ceramic composite according to claim 2 wherein said sialon is composed of at least 60 w/o alpha prime sialon.

7. The ceramic composite according to claim 1 wherein said SiC particles have a median size between 2 to 9 microns.

8. The ceramic composite according to claim 1 having a hardness of at least 94.5 Rockwell A and a fracture toughness, $K_{IC}$(E&C) of about 6 MPa m$^{\frac{1}{2}}$ or more.

9. The ceramic composite according to claim 8 wherein said hardness is at least 95.0 Rockwell A.

10. The ceramic composite according to claim 8 wherein said fracture toughness is at least 6.5 MPa m$^{\frac{1}{2}}$.

11. The ceramic composite according to claim 9 wherein said fracture toughness is at least 6.5 MPa m$^{\frac{1}{2}}$.

12. The ceramic composite according to claim 1 wherein said SiC particles are present at a level of 15 to 50 v/o.

13. The ceramic composite according to claim 1 wherein said SiC particles are present at a level of 5 to 30 v/o.

14. An article of manufacture composed of a ceramic composite consisting essentially of
5 to 50 v/o substantially equiaxed SiC particles dispersed in a ceramic matrix;
said ceramic matrix consists essentially of sialon;
said sialon composed of about 10 to about 67 w/o alpha prime sialon, with beta prime sialon forming the remainder of said sialon;
said SiC particles have an average size of about 1.5 to 15 microns;
and said ceramic composite having a density of at least 3.1 g/cc.

15. The article of manufacture according to claim 14 wherein said article is a seal ring.

16. The article of manufacture according to claim 14 wherein said article is a nozzle.

17. The article of manufacture according to claim 15 wherein said sialon is composed of 10 to 50 w/o alpha prime sialon.

18. The ceramic composite according to claim 1 wherein said ceramic matrix further consists essentially of a sintering aid residue in an amount sufficient to at least substantially encircle said SiC particles and thereby at least substantially separate said SiC particles from said sialon and wherein said sintering aid residue forms between about 0.1 and 15.0 w/o of said ceramic matrix.

19. The ceramic composite according to claim 4 wherein said ceramic matrix further consists essentially of a sintering aid residue in an amount sufficient to at least substantially encircle said SiC particles and thereby at least substantially separate said SiC particles from said sialon and wherein said sintering aid residue forms between about 0.1 and 15.0 w/o of said ceramic matrix.

20. The ceramic composite according to claim 14 wherein said ceramic matrix further consists essentially of a sintering aid residue in an amount sufficient to at least substantially encircle said SiC particles and thereby at least substantially separate said SiC particles from said sialon and wherein said sintering aid residue forms between about 0.1 and 15.0 w/o of said ceramic matrix.

* * * * *